(12) United States Patent
Johnson

(10) Patent No.: US 7,222,177 B2
(45) Date of Patent: May 22, 2007

(54) METHODS AND STRUCTURE FOR IMPLEMENTING WEB SERVER QUALITY-OF-SERVICE CONTROL

(75) Inventor: Teddy Christian Johnson, Issaquah, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1007 days.

(21) Appl. No.: 09/862,538

(22) Filed: May 21, 2001

(65) Prior Publication Data
US 2002/0188734 A1 Dec. 12, 2002

(51) Int. Cl.
*G06F 15/173* (2006.01)
*G06F 15/16* (2006.01)

(52) U.S. Cl. ............... 709/226; 709/227; 709/228; 709/229

(58) Field of Classification Search ......... 709/203, 709/223–229, 236, 238, 239, 240–245
See application file for complete search history.

(56) References Cited

U.S. PATENT DOCUMENTS

| | | | | |
|---|---|---|---|---|
| 5,748,892 A * | 5/1998 | Richardson | ............... | 709/200 |
| 5,913,041 A | 6/1999 | Ramanathan et al. | .. | 395/200.63 |
| 6,003,032 A | 12/1999 | Bunney et al. | ............... | 707/10 |
| 6,047,322 A | 4/2000 | Vaid et al. | ............... | 709/224 |
| 6,055,577 A * | 4/2000 | Lee et al. | ............... | 709/233 |
| 6,058,399 A | 5/2000 | Morag et al. | ............... | 707/201 |
| 6,078,953 A | 6/2000 | Vaid et al. | ............... | 709/223 |
| 6,119,235 A | 9/2000 | Vaid et al. | ............... | 713/201 |
| 6,137,777 A | 10/2000 | Vaid et al. | ............... | 370/230 |
| 6,141,686 A | 10/2000 | Jackowski et al. | ......... | 709/224 |
| 6,151,631 A * | 11/2000 | Ansell et al. | ............... | 709/229 |
| 6,154,776 A * | 11/2000 | Martin | ............... | 709/226 |
| 6,233,602 B1 * | 5/2001 | Van Venrooy et al. | ...... | 709/203 |
| 6,308,216 B1 * | 10/2001 | Goldszmidt et al. | ......... | 709/236 |
| 6,341,309 B1 * | 1/2002 | Vaid et al. | ............... | 709/223 |
| 6,434,607 B1 * | 8/2002 | Haverstock et al. | ......... | 709/217 |
| 6,598,079 B1 * | 7/2003 | Pal et al. | ............... | 709/226 |
| 6,718,330 B1 * | 4/2004 | Zenner | ............... | 707/10 |
| 6,748,508 B1 * | 6/2004 | Khandelwal et al. | ......... | 711/170 |
| 6,799,209 B1 * | 9/2004 | Hayton | ............... | 709/223 |
| 6,865,601 B1 * | 3/2005 | Cherkasova et al. | ......... | 709/220 |

OTHER PUBLICATIONS

Hewlett-(ackard; HP Process Resource Manager User's Guide; Jan. 1995.

* cited by examiner

*Primary Examiner*—Krisna Lim

(57) ABSTRACT

Methods and associated structure for allocating computing resources among the plurality of cgi-bin processes spawned by a Web server process such that high-priority customers receive priority in allocation of such computing resources for cgi-bin processes its bond on behalf of high-priority customers. The methods and structures of the present invention preferably utilize Hewlett-Packard's process resource monitor ("PRM") scheduling features to define customer relationship levels as a parameter in the allocation of computing resources. Customer or user ID information associated with a requesting Web client process are associated with the process on behalf of the requesting client. PRM configuration information then mapped such user or customer ID information to a particular priority level for allocation of computing resources.

17 Claims, 2 Drawing Sheets

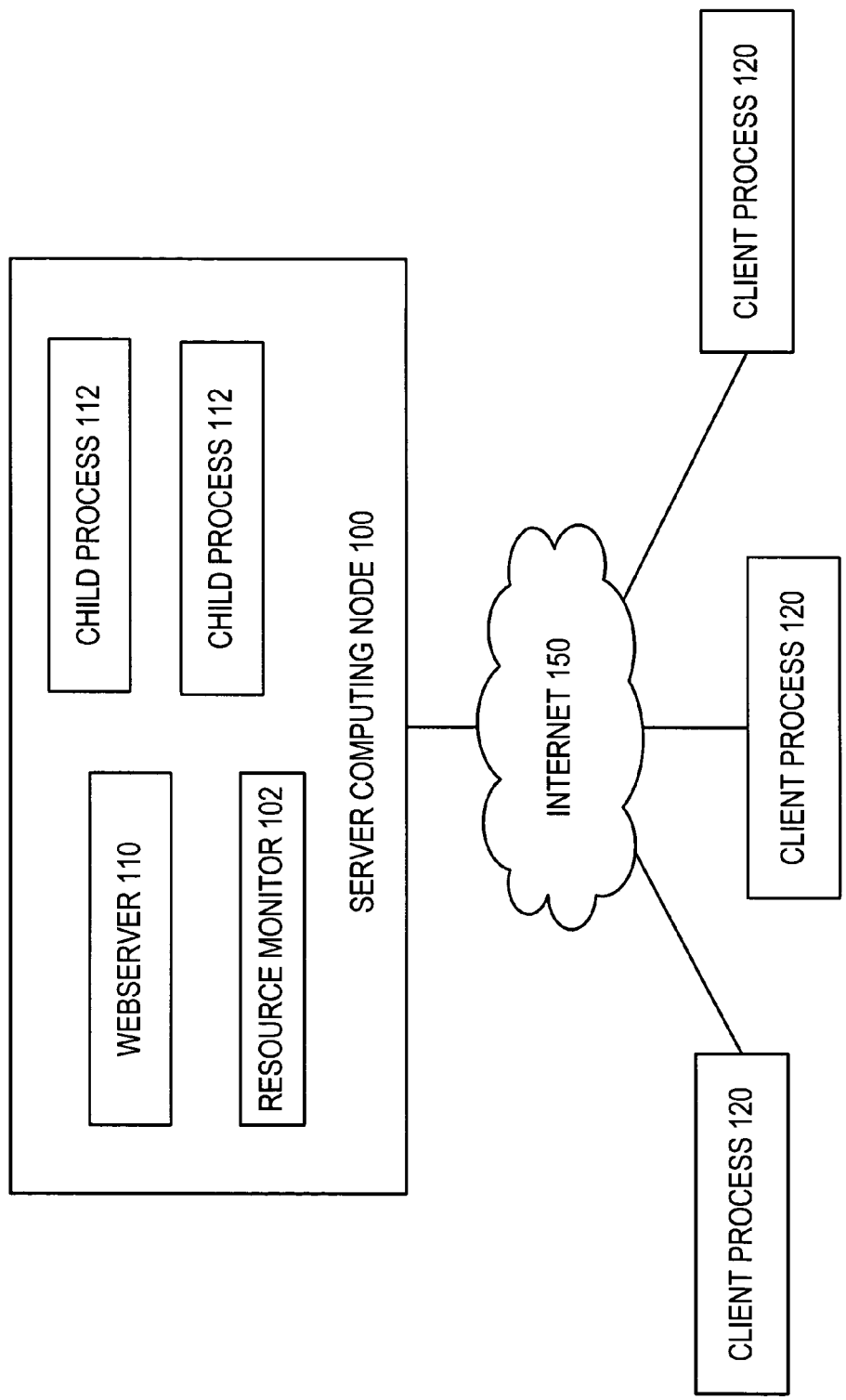

METHODS AND STRUCTURE FOR IMPLEMENTING WEB SERVER QUALITY-OF-SERVICE CONTROL

BACKGROUND OF THE INVENTION

1. Field of the Invention

The invention relates to client/server architecture applications and in particular to Web applications where server resources are allocated according to customer/vendor relation parameters to thereby provide a quality-of-service aspect to allocation of server resources.

2. Discussion of Related Art

It is generally known in a client/server distributed computing applications that a single server process provides services for multiple requesting client processes. In the context of Web services on the Internet, a single Web server process services requests from a potentially large number of Web browser client processes. Simple client requests of a Web server process involve retrieval and return of an HTML page (a "Web page") identified by the universal resource locator ("URL") provided in the client request. Such simple requests are often handled directly by a single thread of the Web server process and involve little more than locating the requests Web page (the files identified by the URL) and returning the data contained therein.

Some Web client requests involve more complex operations such manipulation of information stored in a database associated with the Web server. Such complex requests may involve more computational resources and latency delays than may be appropriate for a single threaded server process. For such complex requests it is common for a Web server process to spawn (also referred to as "fork") a child process to service a specific, complex Web browser client request. Such processes are often referred to as "cgi-bin" processes. These cgi-bin processes perform additional computational services on behalf of the requesting Web browser client.

When cgi-bin processes perform significant computational services such as database manipulation, a large number of such processes may share resources of a single computing node. Each process operating on behalf of a particular Web browser client process therefore may share limited computational resources of the underlying computing node with other cgi-bin processes operating on behalf of other Web browser client processes.

Operating system software operating on most modern computational nodes include features to schedule allocation of resources of the computing node such as allocations of CPU processing time among the multiple processes. In general, multiple processes sharing such a computing node would share the computing resources on an equal priority basis. As is presently practiced in the art, each cgi-bin process operating on behalf of a corresponding requesting Web browser client process would receive essentially equal treatment by the underlying computing node on which the plurality of such processes are operating.

It is also common in Internet Web applications that customers of a service provider may pay different fees corresponding to varying levels of service. For example, a high-priority or high-volume customer may pay additional fees for enhanced responsiveness to their Web client inquiries directed to the service provider. However, when all cgi-bin processes are treated essentially equal as measured by allocation of scarce computing resources, the high-priority or high-volume customer may receive an essentially equal allocation of computing resources for processing of their request as compared with a lower priority or lower volume customer.

It is generally known in computing system architectures that scheduling algorithms within an operating system may modify the allocation of computing resources to particular processes based on a number of parameters. For example, it is known for operating system scheduling algorithms to allocate processor time to different processes based on their respective historical utilization of the CPU. Scheduling algorithms may periodically modify the allocation of CPU time among the various competing processes. For example, processes that utilize significant CPU time may be scheduled for larger blocks of CPU time in subsequent scheduling cycles. Such scheduling algorithms are often referred to as adaptive are dynamic.

Though such adaptive or dynamic scheduling algorithms are known generally in operating systems, it remains a problem to associate allocation of computing resources to particular processes based on parameters associated with the nature of the customer/vendor relationship. In other words, it remains a problem to allocate computing resources of a server node such that high-priority or high-volume valued customers receive a more significant allocation of computing resources than low priority, low volume, lesser valued customers.

In addition, some operating system APIs to spawn new child processes (i.e., a UNIX fork API function) allow the invoking process to supply a priority value for CPU time allocation among the several competing processes. In this manner the Web server process could be modified to adjust the priority assigned to each cgi-bin process as it is spawned to adapt the CPU utilization priority in accordance with the customer/vendor relationship parameter value. However, such a technique would require that the Web server process be modified to determine an appropriate priority level and to supply the determined priority level to the invocation (spawning) of each cgi-bin child process. Modification of the Web server process is not an option in all computing enterprises. Rather, it is common for the enterprise to utilize standard, packaged Web server processes where such modifications are not possible.

It is evident on the above discussion that a need exists for improved to utilization of scheduling techniques to map allocation of computing resources in a manner that correlates to defined levels of priority in the customer/vendor relationship. More specifically, a need exists for improved allocation of resources for Web services and associated cgi-bin processes spawned thereby to map the resource allocation to customer quality-of-service requirements.

SUMMARY OF THE INVENTION

The present invention solves the above and other problems, thereby advancing the state of the useful arts, by providing methods and associated structure for allocating computing resources in a server computing node for servicing multiple client requests in accordance with externally defined customer/vendor relationship information. In particular, the present invention preferably utilizes features of Hewlett-Packard's HP-UX computing systems referred to as the Process Resource Monitor (also referred to herein as "PRM"). PRM allocates computing resources to processes in accordance with priority information defined in the PRM parameters. As utilized herein, PRM parameters link the allocation of resources to particular customer service levels ("quality-of-service") defined by the customer/vendor relationship.

The Hewlett-Packard PRM (formerly referred to as the "fair share scheduler") is operable in the HP-UX operating system environment to provide a framework in which computing resources may be allocated to processes in accordance with predefined attributes and parameters. The PRM configuration information provided in accordance with the present invention defines levels of customer service as a parameter by which computing resources are allocated to the plurality of cgi-bin processes operable on the computing node. High-priority, higher volume, valued customers receive higher priority levels in accordance with the PRM configuration information. When the Web server process spawns such a cgi-bin process, customer or user identification information associated with the requesting Web client process is associated with the cgi-bin process spawned by the Web server. This user ID or customer ID information is then mapped through the PRM configuration information to determine the priority of computing resource allocation to be associated with the spawned cgi-bin process.

In a first aspect, the invention provides a method for providing Web services comprising: receiving a request from a Web client process; spawning a program element to process the request; associating customer ID information with the spawned program; and allocating computing resources on the computing node on which the spawned processes are operable in accordance with the customer ID information. In another aspect, the method includes allocating a minimum level of resources to the spawned program element in accordance with the customer ID information. In another aspect, the method includes allocating a maximum level of resources to the spawned program element in accordance with the customer ID information. In another aspect, the method includes associating the customer ID information by encoding the information in a process name of each spawned program element. The allocation of resources by the method includes allocation of processor time utilization, main memory utilization, and secondary storage bandwidth utilization.

Still other aspects of the invention provide for a system including: a server computing node with a server process operable thereon for processing requests from a plurality of client processes coupled to the server computing node; a plurality of server child processes operable on the server computing node and spawned by the server process to process the requests where each child process is associated with customer ID information; and a process resource manager operable on the server computing node to control allocation of resources among the plurality of server child processes where said resource manager is operable to control allocation of the resources in accordance with the customer ID information associated with each child process.

The above, and other features, aspects and advantages of the present invention will become apparent from the following descriptions and attached drawings.

BRIEF DESCRIPTION OF THE DRAWINGS

FIG. 1 is a block diagram of a system in accordance with the present invention that utilizes resource monitoring to adjust resource allocation for Web services in accordance with customer ID information to provide quality-of-service in accordance with vendor/customer relations.

DETAILED DESCRIPTION OF THE PREFERRED EMBODIMENTS

Figure 2A:
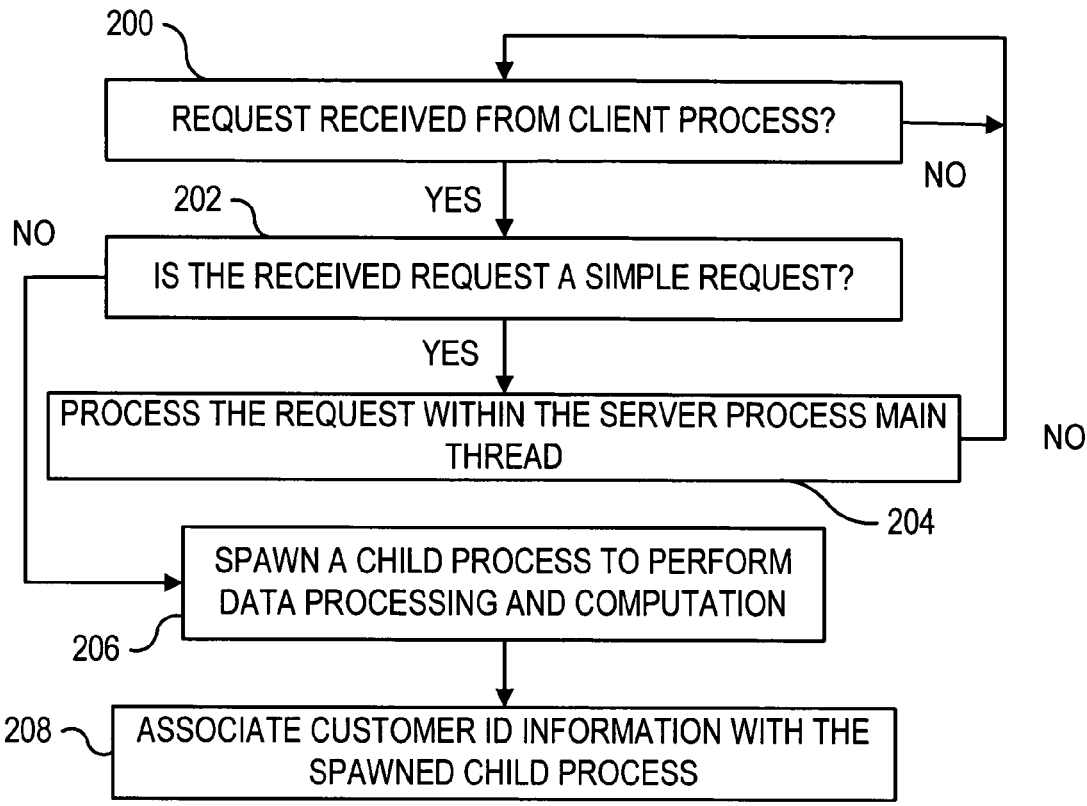
FIGS. 2A, 2B illustrate exemplary flowcharts operable to achieve the desired quality-of-service in accordance with customer ID information associated with the requesting Web client process.

While the invention is susceptible to various modifications and alternative forms, a specific embodiment thereof has been shown by way of example in the drawings and will herein be described in detail. It should be understood, however, that it is not intended to limit the invention to the particular form disclosed, but on the contrary, the invention is to cover all modifications, equivalents, and alternatives falling within the spirit and scope of the invention as defined by the appended claims.

FIG. 1 is a block diagram of a system operable in accordance with the present invention. Web server 110 is operable on server computing node 100 to service requests from a plurality of client processes 120 coupled to server computing node 100 via Internet 150. Web server 110 processes simple Web content requests to retrieve and return the contents of an identified Web page. More complex requests received from client processes 120 may require substantial additional computational processing as compared to the mere retrieval and return of requested HTML content. Where such complex requests are received, Web server 110 spawns child processes 112 to aid in processing of the complex client request. As noted above, such child processes are often referred to as "cgi-bin" processes. The cgi-bin processes 112 carry on their respective processing functions as independent threads in a multithreaded processing environment. Each performs a particular complex computation or data manipulation for satisfying a particular complex client request. Results generated by the cgi-bin processes 112 are returned as required to the corresponding requesting client process 120 via Internet 150.

Typical multithreaded programming environments treat all processes as substantially equal in terms of the measure of resources allocated to each child process. Each child process 112 therefore typically receives an approximately equal allocation of CPU time (processor time), main memory utilization, and secondary storage bandwidth of the server computing node 100. In accordance with the present invention, resource monitor 102 provides for customization of the resource utilization of each process. In particular, resource monitor 102 includes CPU monitor element 104 to monitor CPU time utilization of each process in computing node 100, main memory monitor element 106 to monitor utilization of main memory of computing node 100, and secondary storage monitor element 108 to monitor bandwidth utilization of secondary storage by the various processes within computing node 100.

FIG. 2A is a flowchart describing methods operable within the server computing node in accordance with the present invention. In particular, element 200 through 208 described operation of a typical Web server process operable to receive and process Web browser client requests received from the Internet (or received from internal intranets). Element 200 is first operable to await receipt of a request from a client process. As noted above, such requests may comprise simple requests to retrieve and return contents of an identified HTML web page or may comprise more complex requests requiring substantive data processing. Element 202 therefore determines whether the received request is such a simple request or a more complex request.

If the received client request is a simple request (i.e., a simple request to retrieve and return the HTML content of an identified Web page), element 204 is operable to process the simple request within the server process main thread. Specifically, element 204 retrieves the HTML content of the Web page identified by the URL supplied in the client request and returns the retrieved HTML content to the requesting client process. Processing within the Web server then continues by looping back to element 200 to await receipt of a next request from a Web browser client process. Those skilled in the art will recognize a variety of client requests that may be handled by a single main thread of the Web server process. Retrieving and returning the content of an identified Web page is merely intended as exemplary of such a simple request.

If element 202 determines that the client request requires more complex data processing and computation, a separate thread ("child process") is used to perform the requisite data processing and computation. If a separate thread were not initiated, the additional data processing and computation by a single threaded Web server process may preclude handling of other client requests in a timely manner. By contrast, most present Web server programs spawn child processes to handle such complex requests thereby freeing the main thread of the Web server process (the parent of all children processes) to receive and process other client requests in a timely manner.

Once element 202 so determines that the received client request is a complex request, element 206 is operable to spawn a child process (i.e., a cgi-bin process) to perform required data processing and computation. The spawned child process carries on its processing independent of the operation of the Web server process main threaded. Details of the processing within such a child process are specific to the particular Web browser client request and therefore need not been shown in the context of the present invention. Those skilled in the art will readily recognize that the spawning of such child processes to handle complex requests is known in the art and the specific processing to be performed is determined by the details of the Web client request to be processed.

Lastly, element 208 within the Web server main threaded associates customer ID information with the spawned child process. The customer ID information is preferably information derived from the client Web browser from information supplied in the client request. Such customer ID information may also preferably be recorded within the Web server where the Web server process requires a user to "login" or otherwise authenticate their identity before receiving services from the Web server process.

However such customer identification information is obtained, element 208 is operable to associate the customer ID information with the spawned child process. In the preferred embodiment, such an association may be established by including the customer ID information within the name of the corresponding child process. In this preferred embodiment, no changes are necessary in the Web server process. Rather, the child processes themselves are named in accordance with the customer ID information so as to establish the requisite association. It is desirable, but not required, the Web server process, per se, is not modified. The present invention contemplates both modified Web server processes and unmodified Web server processes. Key to the invention is that the association of customer ID information with the child process is done in such a manner that resource utilization monitor programs within the server computing node may determine how to best allocate computing resources among the various competing child processes.

Figure 2B:
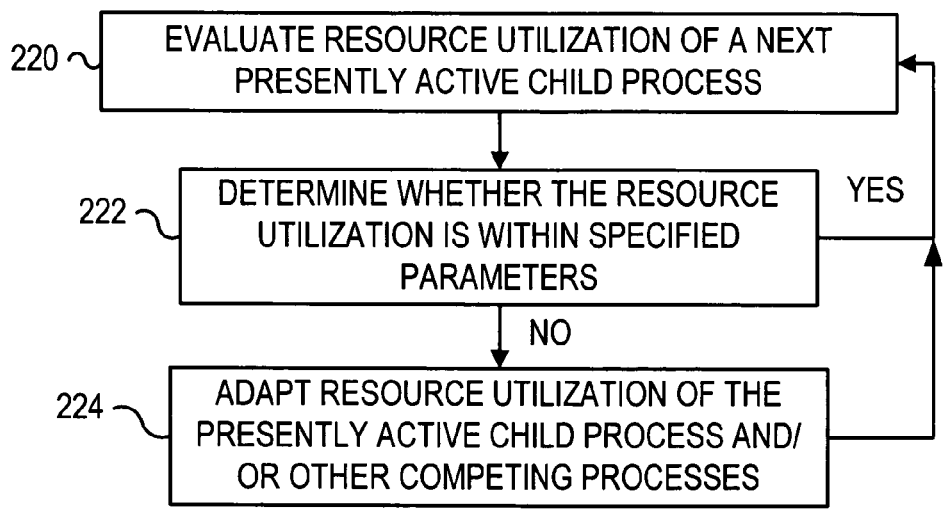

Elements 220 through 224 of FIG. 2B describe the processing of the resource monitor operable within the server computing node to monitor and adjust resource utilization in accordance with customer ID information associated with each child process. In particular, elements 220 through 224 are iteratively operable to periodically monitor and adjust resource allocation within the server computing node. Element 220 is first operable to evaluate the resource utilization of the next presently active child process. Such evaluation is generally performed by gathering statistical data maintained within the computing node's operating system. The specific resource utilization data and API functions used to access such data from the operating system are unique to each particular operating system but generally known to those skilled in the art and familiar with system programming on each such operating system. In general, most present operating systems provide API functions to access at least CPU utilization data, main memory utilization data, and disk bandwidth utilization data. Other operating systems provide further resource utilization parameters and may provide such data in a variety of formats.

Element 222 is operable to determine whether the resource utilization of the presently evaluated active child process is within the specified parameters for the process as determined in accordance with the customer ID information associated with the child process. The determination by element 222 may include verification that at least a predetermined minimum level of resource utilization is available to the child process and may include verification that a particular child process is not exceeding a maximum utilization parameter. If element 222 determines that the resource utilization of the present child processes outside the defined parameter range, element 224 is operable to adapt the resource utilization of the present child process and/or other competing processes in accordance with the specified parameters and customer ID information associated with the child process. Such adaptation may include reducing resource utilization by other processes where a child process is being deprived of the specified minimum level of resource utilization and may also include reducing resource utilization of a particular process where its utilization is exceeding predefined maximum utilization parameters. Key to the invention is evaluating and adapting the resource utilization in accordance with the customer ID information associated with the process.

While the invention has been illustrated and described in detail in the drawings and foregoing description, such illustration and description is to be considered as exemplary and not restrictive in character, it being understood that only the preferred embodiment and minor variants thereof have been shown and described and that all changes and modifications that come within the spirit of the invention are desired to be protected.

What is claimed is:

1. A method for providing Web services comprising the steps of:
   a computing node receiving a request from a Web client process wherein said request includes customer ID information;
   spawning a program element operable on the computing node to process said request;
   associating said customer ID information with the spawned program; and allocating computing resources of said computing node to the spawned program element in accordance with said customer ID information associated with said request.

2. The method of claim 1 wherein the step of allocating comprises allocating a minimum level of resources to the spawned program element in accordance with said customer ID information.

3. The method of claim 1 wherein the allocating comprises allocating a maximum level of resources to the spawned program element in accordance with said customer ID information.

4. The method of claim 1 wherein said customer ID information is encoded in a process name of each said spawned program element.

5. The method of claim 1 wherein said computing resources includes processor time utilization.

6. The method of claim 1 wherein said computing resources includes main memory utilization.

7. The method of claim 1 wherein said computing resources includes secondary storage bandwidth utilization.

8. A system for delivery of services in a client/server distributed environment comprising:
   a server computing node; a server process operable on said server computing node for processing requests from a plurality of client processes coupled to said server computing node;
   a plurality of server child processes operable on said server computing node and spawned by said server process to process said requests from said plurality of client processes wherein each child process of said plurality of server child processes is associated with customer ID information; and
   a process resource manager operable on said server computing node to control allocation of resources of said server computing node among said plurality of server child processes wherein said resource manager is operable to control allocation of said resources in accordance with said customer ID information associated with said each child process.

9. The system of claim 8 wherein said server process is a Web server process, and wherein said each child process is a cgi-bin process.

10. The system of claim 8 wherein said process resource monitor comprises:
   a CPU time resource monitor element for allocating CPU time to said each child process;
   a secondary storage bandwidth resource monitor for allocating secondary storage bandwidth to said each child process; and
   a main memory resource monitor for allocating main memory to said each child process.

11. A system for providing Web services comprising:
   means for receiving a request from a Web client process wherein said request includes customer ID information;
   means for spawning a program element operable on a computing node to process said request;
   means for associating said customer ID information with the spawned program; and
   means for allocating computing resources of said computing node to the spawned program element in accordance with said customer ID information associated with said request.

12. The system of claim 11 wherein said means for allocating comprises:
   means for allocating a minimum level of resources to the spawned program element in accordance with said customer ID information.

13. The system of claim 11 wherein said means for allocating comprises:
   means for allocating a maximum level of resources to the spawned program element in accordance with said customer ID information.

14. The system of claim 11 wherein said customer ID information is encoded in a process name of each said spawned program element.

15. The system of claim 11 wherein said means for allocating includes means for allocating processor time utilization.

16. The system of claim 11 wherein said means for allocating includes means for allocating main memory utilization.

17. The system of claim 11 wherein said means for allocating includes means for allocating secondary storage bandwidth utilization.

* * * * *